March 11, 1969   TOMOYOSHI WATANABE ET AL   3,432,018
TYPE BAR ASSEMBLY FOR TYPEWRITERS
Filed June 19, 1967

Tomoyoshi Watanabe
Yukio Hishida
Takashi Hirata
INVENTORS

BY Wenderoth, Lind & Ponack, Attorneys

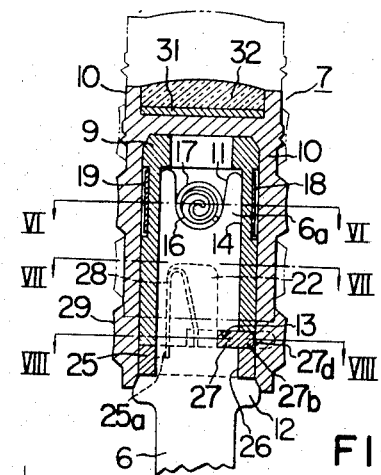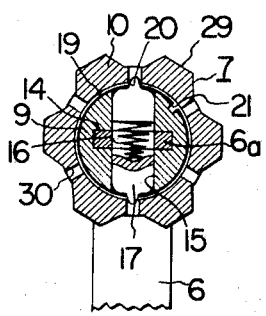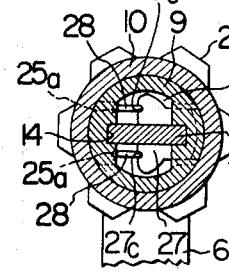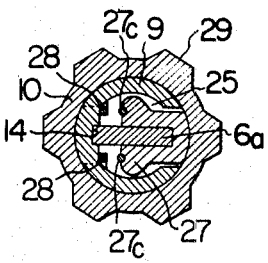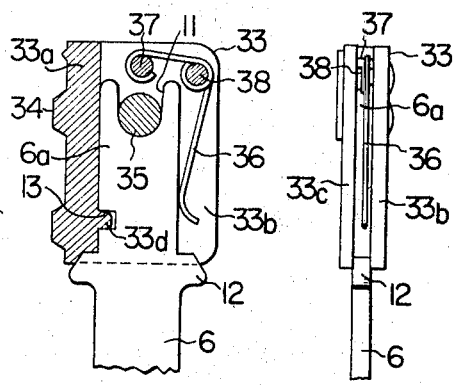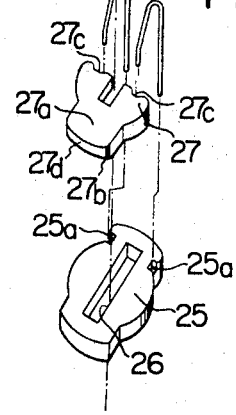

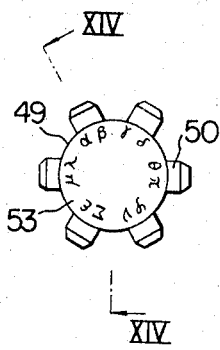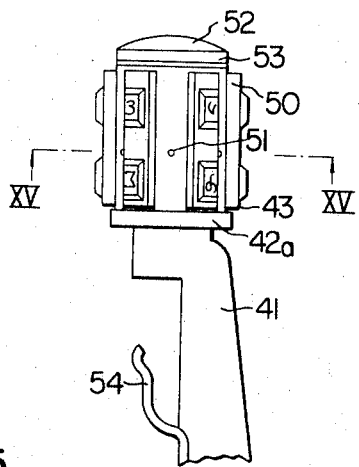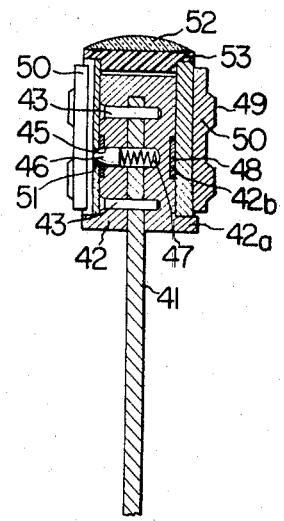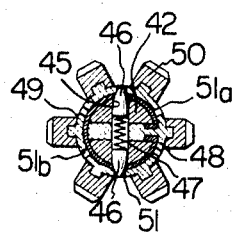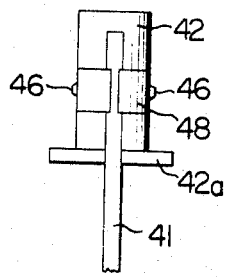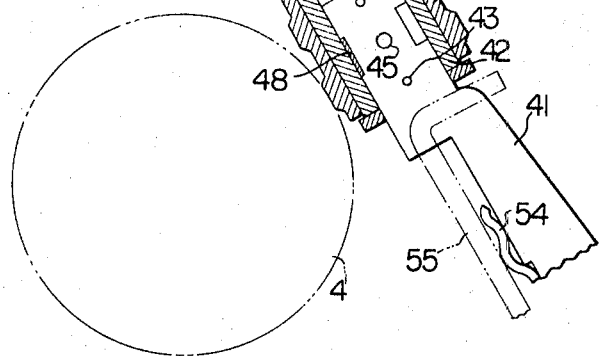

United States Patent Office 3,432,018
Patented Mar. 11, 1969

3,432,018
TYPE BAR ASSEMBLY FOR TYPEWRITERS
Tomoyoshi Watanabe, Yukio Hishida, and Takashi Hirata, Nagoya-shi, Japan, assignors to Brother Kogyo Kabushiki Kaisha, Nagoya-shi, Aichi-ken, Japan
Filed June 19, 1967, Ser. No. 646,845
Claims priority, application Japan, June 24, 1966, 41/41,207; June 30, 1966, 41/42,759; Apr. 14, 1967, 42/23,866
U.S. Cl. 197—36
Int. Cl. B41j 1/32
9 Claims

ABSTRACT OF THE DISCLOSURE

A type bar assembly having a cylindrical core member detachably fixed on the free end of the type bar and type face holding members exchangeably and rotatably mountable on the core member, each of the type face holding members having respectively on its periphery a group of particular characters and marks used in a different specialized field for printing a particular character according to any specialized field.

Additionally, each type holding member can be replaced with a single type face bearing structure with a special type face used rarely by detaching said core member from the type bar.

---

This invention relates to printing and writing machines and more particularly to typewriters.

More specifically, the invention concerns a new type bar assembly for exchanging special type faces for typewriters whereby a large number of special characters and marks can be easily printed.

At the present time, for typewriting letters, documents, and other written matter of general nature in homes and offices, the use of typewriters provided with from 42 to 44 ordinary keys presents no problem or inconvenience.

Frequently, however, there are cases wherein special characters, numerals, symbols, and marks used in specialized fields such as mathematics, medicine, physics, and chemistry appear in texts to be typewritten. The use of typewriters for writing technical reports, specifications, and other like papers has become universal in industry and academic work, and the use of typewriters even by students is increasing. For such uses, an ordinary typewriter without the necessary special type faces is inconvenient in many cases.

When typewriting a document containing such special characters and marks on an ordinary typewriter, the ordinary procedure is to leave blank spaces for those characters and marks for which the typewriter lacks type faces and to fill in these blank spaces later by handwriting. This procedure is extremely troublesome and, moreover, almost invariably results in a document of poor appearance.

Accordingly, there is a great need for typewriters provided with such special types. However, excessively specialized typewriters or those of high price due to their specialized nature would be unprofitable. Rather, a typewriter basically of ordinary character but of reasonably low price and high universality which is capable of typewriting special characters and marks in accordance with necessity is highly desired.

In the past, various attempts have been made to solve the above described problem. For example, in one typewriter proposed heretofore, one type head on a type bar is mounted in a dismountable manner and adapted to be exchangeable with any of other type heads bearing other special type faces. This arrangement is constructionally simple and is suitable for cases where only a few kinds of special types are required. However, in cases where a great variety of different special types are frequently required, this arrangement is inconvenient since the type head must be dismoutned and replaced each time a different special type must be used. Furthermore, this arrangement has been accompanied by other difficulties such as the substantially troublesome task of storing the small special type heads without loss and in a readily available manner.

To overcome these difficulties, there have appeared typewriters of an organization in which a plurality of type faces of special characters or marks are provided on a single type head member or type block mounted at the free end or distal end of a type bar in a rotatable manner whereby any of the special types can be selected and caused to confront the platen for printing. This organization as proposed heretofore, however, is complicated, requires a troublesome operation for type selections, employs a type block which in entirety is massive and heavier than the other type heads, whereby its printing action cannot be performed rapidly, and employs types which cannot be individually exchanged. Because these and other difficulties have not been overcome, these typewriters cannot be said to meet the requirements of the aforementioned desired typewriter.

It is an object of the present invention to provide an exchangeable type face device for typewriters in which the above described difficulties are overcome, and by which any one of a large number of special characters and marks used in various fields can be easily printed on a typewriter basically of a conventional kind.

More specifically, an object of the invention is to provide an exchangeable type face device in which a cylindrical core member is mounted on the free or distal end of a type bar, and an exchangeable type cylinder bearing several special type faces on its peripheral surface is dismountably and rotatably mounted on the core member and selectively turned to place any one of the type faces in position for printing.

Another object of the invention is to provide an exchangeable type face device of the above stated character in which a plurality of mutually exchangeable type cylinders, each bearing a different group of special type faces, are provided.

Still another object of the invention is to provide a device of the above stated character in which the core member is dismountably mounted on the free end of the key bar, and type heads of other design, each bearing a plurality of special type faces and adapted to be directly mounted in a dismountable manner on the type bar are provided, whereby the type cylinders are exchangeable not only among themselves but also with the type head of other design.

A further object of the invention is to provide a device of the above stated character in which the type cylinders and type heads of other design can be mounted on or dismounted from the type bar in a simple manner by a single motion.

A still further object of the invention is to provide a device of the above stated character which is of miniature size and light weight which will not cause appreciable difficulty in high-speed typewriting.

An additional object of the invention is to provide a device of the above stated character which is of simple construction and low price and can be readily and inexpensively installed in not only new typewriters but also existing typewriters of a conventional kind without structural alteration thereof.

Briefly summarized, the present invention, in a principal aspect thereof, resides in an exchangeable type face device for typewriters, characterized by the combination of a key-operated type bar, a cylindrical core member mounted on the distal end of the type bar with an orientation such that the core member axis lies in a plane perpendicular to the axis of the typewriter platen at the instant of printing, a type face bearing member provided around its peripheral surface with a plurality of type faces and mounted on the core member and rotatable about the core member axis, and means for positioning the type face bearing member in any of a plurality of specific rotational positions thereby to set a selected type face in position for printing, whereby any one of the type faces can be selectively caused to print by and in accordance with the rotation of the type face bearing member.

The nature, principle, details, and utility of the invention will be more clearly apparent from the following detailed description with respect to preferred embodiments of the invention when read in conjunction with the accompanying drawings, in which like parts are designated by like reference numerals.

In the drawings:

FIG. 5 is a sectional view taken along the longitudinal plane indicated by line V—V in FIG. 4;

FIG. 6 is a cross sectional view taken along the plane indicated by line VI—VI shown in FIG. 5 and shows a positioning means of the type device;

FIG. 7 is a cross sectional view taken along the plane indicated by line VII—VII shown in FIG. 5 and shows a locking means for the type device;

FIG. 8 is a cross sectional view taken along the plane indicated by line VIII—VIII shown in FIG. 5;

FIG. 9 is an exploded perspective view showing only the parts of the cylindrical core member of the type device;

FIG. 10 is a side view in longitudinal section showing a type head of a different form in the mounted state on the end of a type bar;

FIG. 11 is a rear view of the type head in the mounted state shown in FIG. 10;

FIG. 12 is an outer end view showing a type cylinder of another example of a type device according to the invention;

FIG. 13 is a side elevational view showing the type cylinder shown in FIG. 12 in the mounted state on a type bar with a buffer spring;

FIG. 14 is a sectional view taken in the planes indicated by line XIV—XIV in FIG. 12;

FIG. 15 is a cross sectional view taken in the plane indicated by line XV—XV in FIG. 13;

FIG. 16 is a side elevational view showing only the core member on which the type cylinder shown in FIGS. 12 and 13 is to be mounted; and FIG. 17 is a side elevational view, partly in section, showing the state of the type cylinder, core member, and type bar at the instant of the printing operation, the platen being considerably reduced in size.

Figure 1:
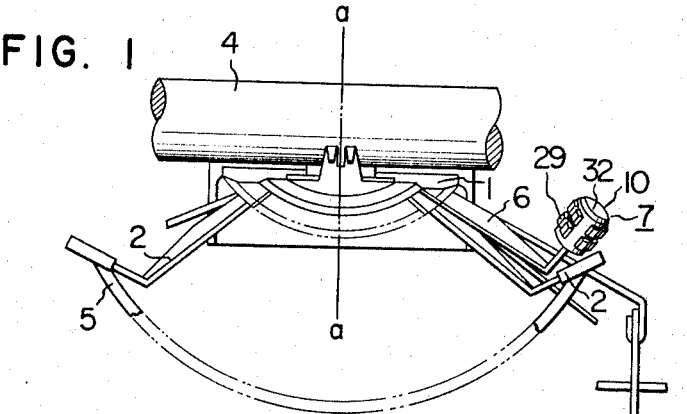
FIG. 1 is a partial top plan view, with parts broken away and parts deleted, showing the essential parts and organization of a typewriter provided with the type device according to invention, shown in the state of rest.
Figure 2:
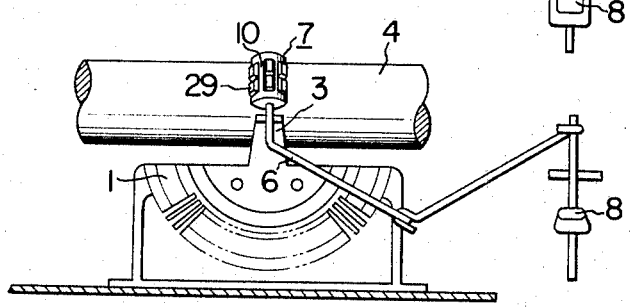
FIG. 2 is a view similar to FIG. 1, showing the type device in the operational state of striking the platen for printing on a sheet of paper (not shown) overlying the platen.
Figure 3:
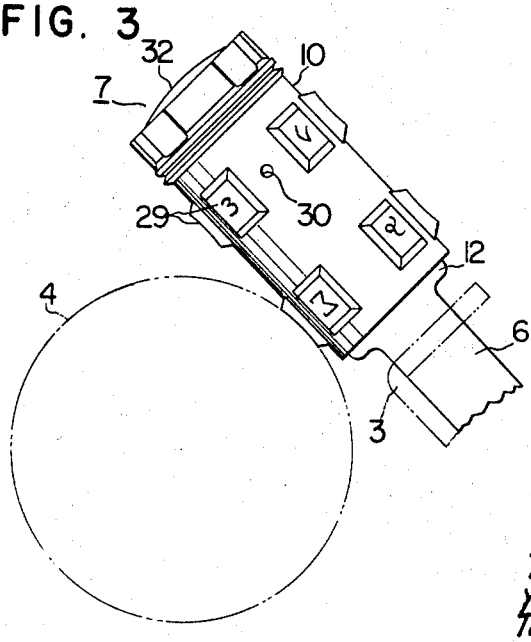
FIG. 3 is an enlarged side elevational view showing the type cylinder of the type device shown in FIGS. 1 and 2 in the mounted state, the platen being considerably reduced in size.
Figure 4:
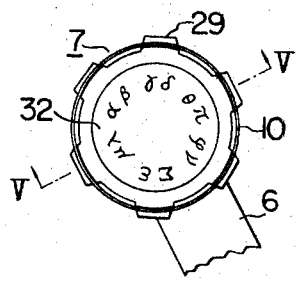
FIG. 4 is an enlarged outer end view of the type cylinder shown in FIG. 3.

Referring first to FIGS. 1 and 2, the printing mechanism of the typewriter shown therein comprises, essentially, a type bar segment 1, a plurality of type bars 2 disposed in radial arrangement and pivoted at their base or proximal ends on the segment 1, a type bar guide 3 disposed at the center of the segment 1, a platen 4 for supporting paper to be typewritten, and a type bar rest 5 for supporting the type bars 2 in their inoperative state of rest as indicated in FIG. 1. These parts and their arrangement are similar to those of conventional typewriters.

According to the invention, there is provided at least one type bar 6 for exchangeable types pivoted at its base or proximal end to the type bar segment 1 at one end thereof in a conventional manner similar to that of the other type bars 2. The type bar 6 has a substantially flat shape in cross section and is so bent at a point near its free or distal end 6a that its free end 6a lies in a plane (as indicated by intermittent line a—a in FIG. 1) perpendicular to the axis of the platen 4 at the instant the type bar completes its swinging movement toward the platen 4 for printing. The type bar 6 is swung through its printing stroke from its rest position as shown in FIG. 1 to its printing position shown in FIG. 2 when a corresponding key 8 linked to the type bar 6 is struck and depressed; this action being known and being the same as that of any of the other type bars 2 and corresponding keys.

A changeable type head 7 according to the invention is mounted on the free end 6a of the type bar 6. This changeable type head 7 has a principal structure consisting essentially of a cylindrical core member 9 fitted onto the end 6a of the type bar 6 and a type cylinder 10 rotatably fitted on the core member 9, these two parts being formed principally from a synthetic resin material.

The free end 6a of the type bar 6 is in the form of a flat plate, as mentioned briefly hereinbefore and as shown in FIGS. 5 and 10, and has an extremity with a yoke-like arcuate cutout 11 and shoulder projections 12, 12 on opposite sides of its base part, against which the core member 9 abuts in the mounted state. Between the extremity of the end 6a and the shoulder projections 12, 12, there is formed a cutout 13 for engagement with a locking member 27 to be described hereinafter.

The cylindrical core member 9 has a partly hollow interior, and in the interior, a rectangular groove 14 is formed in the axial direction of the core member 9 for receiving the end 6a of the type bar 6 when the core member 9 is fitted and thereby mounted thereon. When the core member 9 is thus mounted, it can move only in its longitudinal direction and is positioned in its mounted state by the projections 12, 12.

The cylindrical core member 9 is further provided with a transverse hole 15 with an axis passing perpendicularly through the axis of the core member 9. This hole 15 is for slidably accommodating a compression coil spring 16 and a pair of pins 17, 17 respectively disposed at the ends of the coil spring 16 and pressed by the elastic force thereof in directions tending to cause them to protrude outwardly from the hole 15. The outer end of each pin 17 is in the form of a cone with a rounded tip.

Around the outer circumference of the cylindrical core member 9 and covering the hole 15, there is provided a reduced diameter part 18 of reduced outer diameter and of constant width in the longitudinal direction. A band 19 of thin sheet material is wrapped closely in and around the reduced diameter part 18 and is provided with diametrically opposed holes 20, 20 aligned coaxially with the hole 15 and corresponding pins 17, 17 and retaining these pins under spring pressure with their rounded conical tips projecting somewhat outside of the band 19. A longitudinal groove 21 is formed from the outer end (upper end as viewed in FIG. 9) of the core member 9 to and across the part 18, and the band 19 is fixedly held to the core member 9 by bending the end edges of the band inwardly and fitting these bent edges into the groove 21.

The cylindrical core member 9 is further provided at its inner end (lower end as viewed in FIG. 9) with a coaxial hollow cavity 22 opened at the bottom end and a pair of diametrically opposed cutouts 23, 23. Contiguous to one of the cutouts 23, 23, there is formed a still deeper but narrower window cutout 24 whereby the lateral edges of this cutout 23 and the window 24 are stepped.

A plug member 25 is formed to fit into the cutouts 23, 23 and is provided in its central part with a rectangular slot 26 for insertion therethrough of the type bar free end 6a. When this plug member 25 is fitted into the cutouts 23, 23, and bonded integrally to the core member 9, the hollow cavity 22 is closed, and, at the same time, there is formed at the cutout 24 a rectangular window communicating with the cavity 22.

The aforementioned locking member 27 is movably accommodated within the cavity 22 of the core member 9 in such a manner such that it can move in a direction perpendicular to the axial direction of the core member 9 in contact with the inner surface of the plug member 25 as a latch part 27a forming a part of the locking member 27 moves between a locking position at which the latch part 27a engages with the aforementioned cutout 13 in the type bar free end 6a and a release position at which it cannot engage with the cutout 13.

On one hand, another part 27b of the locking member 27 is slidably fitted in the window 24 of the core member 9 and slides therein throughout the movement of the locking member 27. Accordingly, when the latch part 27a of the locking member which moves in the above described manner is in the position where it is engaged with the cutout 13, it locks the core member 9 against extraction from the type bar end 6a, and, when the latch part 27a is in the position where it cannot engage with the cutout 13, the core member 9 is released so that it can be extracted.

A pair of springs 28, 28 is provided to exert a constant force on the locking member 27 urging it toward the release position where it cannot engage with the type bar end 6a. The springs 28, 28 are supported at their ends on one side in spring receiving parts 27c, 27c of the locking member 27 at their other ends in spring receiving recesses 25a, 25a of the plug member 25. Simultaneously with the bonding of the plug member 25 to the core member 9, the above mentioned other ends of the springs 28, 28 are constricted by the inner surface of the core member 9, as indicated in FIG. 7, whereby they cannot be readily extracted from their spring receiving parts 25a, 25a.

Furthermore, when the locking member 27 is in its release position, the part 27b thereof fitted into the window 24 is in a state wherein it protrudes outwardly through the window 24. By causing this protruding part 27b to slide and retract into the window 24 against the force of the springs 28, 28, the locking member 27 can be returned to its locking position. A cam face 27d is provided at the part 27b which protrudes out through the window 24. When the aforementioned type cylinder 10 is fitted onto the core member 9 from its outer end, this cam face 27d is engaged and pressed inward by the skirt end of the type cylinder 10, whereby the part 27b of the locking member is automatically forced into the window 24.

The type cylinder 10 is made of a synthetic resin material and is molded into the shape of a hollow cylinder with a closed outer end (upper end as viewed in FIG. 5) and with a plurality of type faces 29 arranged at evenly spaced intervals around its outer cylindrical surface. While, in the example illustrated in FIGS. 3 through 9, the type faces 29 comprise a total of 12 type faces at six circumferential positions with two (upper and lower) type faces at each position, the type faces being of special characters used in mathematics, it will be apparent that type cylinders bearing other special characters such as those used in the fields of medicine, physics, and chemistry can also be readily prepared for their respective fields. It will be apparent, moreover, that the number of type faces on each type cylinder can also be increased.

In the illustrated example, the type faces 29 of the type cylinder 10 are arranged in upper and lower rows, and while the state of the type mechanism for printing with a lower type face is illustrated, an upper type face can be caused to print by pressing the shift key of the typewriter, similarly as in known typewriters.

When the type cylinder 10 is fitted onto the core member 9, the skirt part of the type cylinder simultaneously engages with the cam face 27d of the locking member 27 protruding through the window 24 of the core member and causes the part 27b to retract automatically into the window 24, as mentioned hereinabove and as indicated in FIG. 5. At the same time, the locking member 27 is thereby caused to move to its locking position, whereby the core member 9 is locked relative to the type bar end 6a. That is, the locking member 27 is positioned to permit removal of the core member 9 from the type bar end 6a when the type cylinder 10 is not fitted on the core member 9 and to lock the core member 9 fixedly to the type bar end 6a when the type cylinder 10 is fitted on the core member.

The type cylinder 10 is provided around its circumference at intervals corresponding to the six circumferential positions of the type faces 29 with diametrically opposed pairs of click engagement holes 30 aligned in positions to engage with the conical tips of the aforementioned pairs of pins 17, 17. By the engagement of the pins 17, 17 with a pair of holes 30, the type cylinder 10 is held in a specific and consistent position relative to the core member 9 in the axial direction and in the rotational direction about the axis thereof. This specific position is so predetermined that, when the type bar 6 is actuated by depressing the key 8, one of the type faces 29 will be accurately positioned at the printing point.

A desired type face selected from among the type faces 29 on the type cylinder 10 is placed in this specific position by grasping the outer end of the type cylinder 10 and turning it in either direction until the selected type face arrives at the specific position and the pins 17, 17 click into the corresponding holes 30 to establish and hold the position.

In other words, the pair of pins 17, 17 within the core member 9 hold the type cylinder 10 in its mounted position with respect to the core member 9 and, at the same time, constitute positioning or indexing means functioning in cooperation with the click engagement holes 30 formed in the type cylinder 10 to set the rotated type cylinder at the specific positions.

The periphery of the outer or upper end of the type cylinder 10 is provided with frictional grip means as illustrated for convenience in turning the type cylinder.

The type cylinder 10 has at its outer or upper end a concavity in which a type indicating plate 31 is inserted and covered by a transparent cover 32 made of an acrylic resin. The type indicating plate 31 is provided with engraved characters or marks corresponding in kind and angular position to the above described type faces 29 of the type cylinder 10. The outer surface of the transparent cover 32 is in the form of a convex lens and bulges outward beyond the rim of the above mentioned concavity, whereby the characters or marks on the plate 31 are magnified and, moreover, can be readily identified even from a position somewhat offset to one side of the axis of the type cylinder 10.

The characters or marks on the plate 31 are preferably arranged in a manner such that a type face set in position for printing is indicated by the corresponding character or mark which is in upright orientation as viewed by the typist.

Thus, the type head 7 according to the invention is made up essentially of the core member 9 in the form of a cylindrical post and the type cylinder 10 fitted thereover. In mounting the type head 7, the core member 9 is first fitted onto the type bar end 6a, and then, over this core member 9, the type cylinder 10 provided with the desired special type faces is fitted, whereupon, simultaneously with this fitting on of the type cylinder, the above described locking means operates automatically to lock the core member 9 fixedly to the type bar end 6a. At the same time, the positioning and indexing means provided between the core member and the type cylinder operates to hold the type cylinder positively in its mounted position and to set it positively and accurately in its specific index position selected by rotating the type cylinder.

Furthermore, when the mounted type cylinder 10 is to be replaced with another type cylinder, only the type cylinder 10 is pulled off the core member 9, and the other type cylinder is fitted onto the same core member 9.

The type head 7 according to the invention is adapted to afford not only interchanging of type cylinders as described above but also interchanging between these type cylinders and type heads of different construction as described below. When the type cylinder 10 is pulled off the core member 9, the core member 9 is released from the locked state due to the locking member 27 and can be removed from the type bar end 6a, as described above. After the core member 9 has been thus removed, a type head of another kind as, for example, type head 33 shown in FIGS. 10 and 11 can be fitted directly onto the type bar end 6a.

The type head 33, which is one example of another type head which can be used in accordance with the invention, has an integral structure consisting of a type body 33a provided with upper and lower type faces 34 and a pair of parallel side flanges 33b and 33c projecting rearward (rightward as viewed in FIG. 10) from the type body 33a. A narrow slot is thereby formed and surrounded on three sides by the type body 33a and side flanges 33b and 33c, and this slot is designed to receive the type bar end 6a when the type head 33 is mounted thereon.

A positioning pin 35 is fixed to the inner surfaces of the side flanges 33b and 33c at a position to engage with the aforementioned arcuate cutout 11 at the tip of the type bar end 6a so as to position the type head 33 accurately with respect to the type bar 6. An engagement lug 33d is formed to project from the inner surface of the type body 33a and engages with the aforementioned cutout 13 of the type bar end 6a when the type head 33 is fitted thereon thereby to lock the type head in mounted position and prevent its being removed. A holding spring 36 is provided in the type head 33 to exert a force tending to press the lug 33d in the direction of its engagement with the cutout 13. This spring 36 has a free end adapted to press against the rear edge of the type bar end 6a, a fixed end anchored on an anchor pin 37, and an intermediate coil part coiled about a fixed pin 38. The pins 37 and 38 are secured to the side flanges 33b and 33c.

The type head 33 of the above described simple construction can be easily mounted on and removed from the type bar end 6a. When a mounted type head is to be removed, it is moved forward against the force of the spring 36 until the lug 33d disengages from the cutout 13 and is then pulled off the type bar end 6a. When a type head is to be mounted, the above procedure is reversed. Thus, the mounting and dismounting procedures are simple, yet there is no possibility of a mounted type head becoming loose or being dismounted during its normal printing operation.

While only one example type head 33 having a construction different from that of the type cylinder 10 but being interchangeable with the type cylinder 10 has been described above, it will be apparent that other type heads of various forms can be designed to be mounted on the same type bar end 6a.

In another embodiment of the present invention as illustrated in FIGS. 12 through 17, a type bar 41 of flat plate form is adapted at its proximal end to be actuated by a key to accomplish printing in the conventional manner. At its distal or free end, the type bar 41 is so formed as to be insertable into a central longitudinal slot in a cylindrical core member 42. The core member 42 thus supported is fixed to the type bar end by pins 43, 43, the axis of the core member 42 being substantially coincident with the longitudinal axis of the free end of the type bar 41 and orientated in a direction such that it will lie in a plane perpendicular to the axis of the typewriter platen 4 at the instant of printing.

The core member 42 is provided around its base part with a flange 42a and around its middle part with a shallow groove 42b. At the middle part of this groove 42b, there is formed a through hole 45 passing through the core member 42 with a centerline perpendicularly passing through the centerline of the core member 42. The through hole 45 slidably accommodates a pair of pins 46, 46 respectively at the open ends of the hole 45 and a compression spring 47 exerting on the pins 46, 46 an outward force, similarly as in the arrangement of pins 17, 17 and spring 16 of the first example of the invention illustrated in FIGS. 1 through 9. The outer ends of the pins 46, 46 are of cone-like form with rounded tips.

A band 48, similar to the band 19 of the head 7 illustrated FIGS. 1 through 9, is disposed around the core member 42 and fitted in the aforementioned shallow groove 42b, and the end edges of this band 48 are bent inward and fitted in a space on one side of the core member 42 at its part engaging with the type bar end. The band 48 is provided at its middle part with diametrically opposed holes 51 coaxially aligned with the above mentioned through hole 45 in the core member 42 and adapted to permit the outward protrusion therethrough of only a limited length of the conical tips of the pins 46, 46 slidably disposed in the through hole 45 and urged outwardly by the compression spring 47.

A type cylinder 49, similar to the type cylinder 10 in the aforedescribed example of the invention, is rotatably and removably fitted on the core member 42 in coaxial relationship thereto.

The type cylinder 49, similarly as in the aforedescribed type cylinder 10, is provided with a plurality of type faces 50, pairs of diametrically opposed holes 51 for click engagement with the tips of the pins 46, 46 thereby to hold the type cylinder 49 against movement in the axial direction with respect to the core member 42 and to effect rotational indexing of the type cylinder 49, a type indicating plate 53, and a transparent covers 52 of lens form. Since the organizational and operational features of the type cylinder 49 are similar to those of the aforedescribed type cylinder 10, further detailed description thereof will be omitted.

A further feature of the type device illustrated in FIGS. 12 through 17 is the provision of a shock absorbing or buffer spring 54 fixed to the edge of the shank of the type bar 41 on its side facing the typewriter platen 4. The buffer spring 54 is positioned to contact the type guide 55 of the typewriter and thereby to absorb excessive impact to which the type bar 41 may otherwise be subjected at the time of its percussive printing stroke. Accordingly, the type face 50 at the end of the type bar 41 is caused to contact the platen 4 with a suitable force for printing yet without damage to the type face 50. Furthermore, by varying the spring constant of the spring 54, the printing force can be varied.

In general, the provision of several type faces on a single type bar tends to result in a type bar with an excessively heavy type end in comparison with ordinary type bars, whereby an extremely large finger force is required on the corresponding key to operate the key bar in printing. Furthermore, the key bar, once actuated, has a large momentum which gives rise to a severe impact of the type face on the platen.

According to the present invention, in order to overcome this difficulty, the parts constituting the exchangeable type head 7 as illustrated in FIGS. 1 through 9 are substantially miniaturized and reduced in weight, the core member 9 being made of a light weight synthetic resin, the type cylinder 10 being made of a light weight synthetic resin or an aluminum alloy, and the band 19 being made of a thin steel. In an actual instance of practice, the length of the type cylinder 10 is approximately 17 mm., and its overall diameter is approximately 10 mm. The total weight of a type head 7 with type cylinder 10 and core member 9 made of a synthetic resin is on the order of one gram. Even with an aluminum-alloy type cylinder 10 and a synthetic-resin core member 9, the total weight of the type head 7 is on the order of 1.4 grams.

It has been found that a key bar 6 provided with the type head 7 according to the invention can be easily operated with a light key touch, there being almost no sensible difference between this key touch and that for an ordinary type bar.

Thus, as described above, the present invention provides, in an ordinary typewriter, a multiple variable, exchangeable type device having a type cylinder with several special type faces, which type cylinder can be interchanged with other type cylinders each bearing several other special type faces or with other kinds of multiple type heads. Accordingly, by installing at least one key bar with a free end according to the invention in an ordinary typewriter and providing type cylinders or type heads with type faces required by the user, a low-price typewriter of great universality which can be used without inconvenience for typewriting relating to any specialized field is afforded.

A further feature of the invention is that the interchanging between type cylinders or between type cylinders and other kinds of type heads can be carried out in a very simple manner, and, moreover, the selective changing of type faces on a mounted type cylinder can be accomplished by a mere light turning.

Another feature of the invention, as stated hereinbefore, is the miniaturized size and low weight of the type device 7 due principally to the use of a type cylinder and a core member made of synthetic resin, whereby only a normal key touch is required for operating the key bar in printing.

Since it is logical to install the type bar of the invention in a position at either end of the type bar segment of the typewriter, the type bar is provided with a bend as shown in FIGS. 1 and 2 whereby the axis of the type cylinder 10, that is, the direction in which the type cylinder can be extracted, is at a large angle relative to the direction of the centrifugal force imparted to the type device during the stroke of the type bar. Accordingly, the possibility of the type cylinder slipping off the key bar, even during high-speed typing, is further reduced.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What we claim is:

1. An exchangeable type device for typewriters having a platen, a type bar segment, and keys, said device comprising in combination:

an ordinary plate-like type bar with its base end swingably pivoted to the type bar segment and with its other end being free and adapted to have mounted thereon a type head and being coupled to one of the keys and operative for carrying out a printing stroke toward the platen upon depression of said key;

a cylindrical core member detachably mounted on the free end of said type bar with the cylindrical axis lying in a plane perpendicular to the platen axis at the instant of striking of the type bar against the platen;

locking means in said core member for fixing said cylindrical core member in the mounted state on the type bar;

a hollow type cylinder having a plurality of type faces around the outer peripheral surface thereof in an evenly spaced arrangement and a plurality of tiny holes in positions corresponding with the positions of said type faces, said type cylinder being rotatably mounted on the cylindrical core member for rotating about the axis of said cylindrical core member; and positioning means in said core engageable with said tiny holes for positioning the type cylinder to set and index a selected one of the type faces in position for printing, said free end of the type bar being adapted to receive thereon interchangeably with said cylindrical core member and the type cylinder, a single type face bearing structure, whereby a wide assortment of various special types other than those provided on said type cylinder can be typed on said typewriter.

2. An exchangeable type device as claimed in claim 1, in which said core has a plurality of transverse diametral holes through said axis, and said positioning means comprises a pair of pins slidably disposed within said cylindrical core member in a direction perpendicular to the longitudinal axis of said cylindrical core member, a spring interposed between said pair of pins to urge them outwardly to project from the holes provided on said cylindrical core member into click engagement with the tiny holes formed in said type cylinder to set the rotated type cylinder at specific positions, and a band around said cylindrical core member and provided with a plurality of holes in correspondence with said holes in said cylindrical core member and through which the ends of said pins project, said band retaining said pins in said core.

3. An exchangeable type device as claimed in claim 1, in which said type cylinder is mounted on said cylindrical core member for removal in the axial direction thereof.

4. An exchangeable type device as claimed in claim 1, in which said locking means is inoperative when the type cylinder is not mounted on the cylindrical core member, and is engaged by said type cylinder and becomes operative upon mounting of said type cylinder on the cylindrical core member thereby enabling the cylindrical core member to be removed from the type bar when the type cylinder is detached from the core member.

5. An exchangeable type device as claimed in claim 1, in which there is a cutout in a side edge of the free end of said type bar, and said locking means comprises a latch member slidably disposed within the cylindrical core member and slidable in a direction perpendicular to the axis of said cylindrical core member and being engageable in said cutout for locking said core member to said type bar, spring means engaging said latch member normally urging said latch member toward the disengaging position from the cutout where a part of said latch member protrudes outside of the cylindrical core member, and the type cylinder having a skirt part engageable with the protruding part of said latch member at the time of its mounting on and over the core member to move the latch member into the locking position wherein said part of the latching member engages with said cutout, whereby the cylindrical core member can be locked to the type bar when the type cylinder is mounted on the cylindrical core member.

6. The improvement as claimed in claim 1 in which said positioning and holding means include a pair of pins disposed slidably within the cylindrical core member in a direction perpendicular to the axis of the core member, a spring urging said pins outwardly relative to the core member, a band wound around said cylindrical core member and provided with holes through which said pins project slightly outwardly from the band and retaining said pins in said projecting position, and several tiny holes provided in and around the type cylinder in correspondence with the type faces to be engaged by the projecting parts of said pins.

7. An exchangeable type device for typewriters having a platen, a type bar segment, and keys, said device comprising in combination:
- an ordinary plate-like type bar with its base end swingably pivoted to the type bar segment and with its other end being free and adapted to have mounted thereon a type head and being coupled to one of the keys and operative for carrying out a printing stroke toward the platen upon depression of said key, the free end having a cutout and an abutment shoulder;
- a cylindrical core member having a slot therein extending in the axial direction thereof receiving the free end of said type bar, and having transverse holes therein extending in the diametrical direction through the axis, the axis of said cylindrical core member, when it is mounted on said type bar, lying in a plane perpendicular to the platen axis at the instant of striking of the type bar against the platen; the cylindrical core member further having an aperture in the outer peripheral surface thereof;
- a latch member movably mounted within the cylindrical core member and having a latch part engageable with said cutout of the type bar when the cylindrical core member is mounted fully into abutment with the abutment shoulder, and a protruding part protruding outside through the aperture in the outer peripheral surface of the cylindrical core member;
- latch holding means including spring means pressing and holding said latch member in a position where said protruding part protrudes outside through said aperture, and where said latch member is disengaged from the cutout of the type bar, when the latch member is inoperative;
- a pair of pins slidably positioned in said transverse hole in the cylindrical core member and respectively having outwardly directed conical heads;
- spring means in said hole exerting outward force on said pins;
- pin holding means on said core cooperating with said spring means to hold the pins at positions where their conical heads protrude outwardly from the outer surface of said cylindrical core member; and
- a hollow cylindrical type cylinder detachably mounted on the cylindrical core member and movable onto and off said core member in the axial direction thereof, and rotatable about the axis of the core member, said type cylinder having around its periphery a plurality of type faces evenly spaced from each other and several tiny holes in positions corresponding with the type faces and engaging with said protruding part of the latch member, said type cylinder engaging said latch member and moving counter to the force of said spring means of the latch holding means at the time of the mounting of the type cylinder on and over the core member to render the latch member operative, thereby to engage the latch part of the latch member with the cutout of the type bar for locking the cylindrical core member to the type bar, and said tiny holes receiving and holding the conical heads of the pins within the cylindrical core member for positioning the type cylinder to set a selected one of the type faces in position for printing, thereby enabling a required one of the type faces to print upon the selective setting of the type cylinder about its axis.

8. An exchangeable type device for typewriters having a platen, a type bar segment, and keys, said device comprising in combination:
- an ordinary plate-like type bar with its base end swingably pivoted to the type bar segment and with its other end being free and adapted to have mounted thereon a type head and being coupled to one of the keys and operative for carrying out a printing stroke toward the platen upon depression of said key;
- a cylindrical core member detachably mounted on the free end of said type bar with the cylindrical axis lying in a plane perpendicular to the platen axis at the instant of striking of the type bar against the platen;
- locking means in said core member for fixing said cylindrical core member in the mounted state on the type bar;
- a hollow type cylinder having a plurality of type faces around the outer peripheral surface thereof in an evenly spaced arrangement, and mounted on the cylindrical core member for rotating about the axis of the cylindrical core member and being detachable by movement in the axial direction thereof; and
- means in said core engageable with said type cylinder for positioning the type cylinder to set a selected one of the type faces in position for printing and for holding said type cylinder positively in its mounted position during the printing operation of the type bar to prevent the type cylinder from moving accidentally relative to the cylindrical core member in the axial direction thereof;
- said locking means being inoperative when the type cylinder is not mounted on the core member, and being engaged by the type cylinder and moved to the locking position upon mounting of said type cylinder on said cylindrical core member, whereby the cylindrical core member can be removed from the type bar when the type cylinder is detached from the core member.

9. An exchangeable type device for typewriters having a platen, a type bar segment, and keys, said device comprising in combination:
- a type bar having its base end swingably pivoted to the type bar segment and having its other end free and adapted to have mounted thereon a type head and being coupled to one of the keys and operative for carrying out a printing stroke toward the platen upon depression of said key;
- a cylindrical core member fixed on the free end of said type bar, and having transverse holes therein extending in the diametrical direction through the axis of said cylindrical core member, the axis when the core is mounted on said type bar, lying in a plane perpendicular to the platen axis at the instant of striking of the type bar against the platen;
- a pair of pins slidably positioned in said transverse holes in the cylindrical core member and respectively having outwardly directed conical heads;
- spring means in said hole exerting outward force on said pins;
- a band around the outer surface of said cylindrical core member and provided with holes through which said pins project slightly outwardly from the holes in said band and retaining said pins in said projecting position; and
- a hollow cylindrical type cylinder detachably mounted on the cylindrical core member and movable onto and off said core member in the axial direction thereof, and being rotatable about the axis of the core member, said type cylinder having on its peripheral surface a plurality of various typing letters arranged at equally spaced intervals and having several tiny holes in positions corresponding with the typing letters, and said tiny holes receiving and holding the conical heads of the pins within the cylindrical core member for positioning the type cylinder to set a selected one of the typing letters in position for printing, thereby enabling a required one of the typing letters to print upon the selective setting of the type cylinder about its axis.

(References on following page)

References Cited

UNITED STATES PATENTS

| | | | |
|---|---|---|---|
| 640,699 | 1/1900 | Quentell | 197—36 |
| 2,044,550 | 6/1936 | Teissedre | 197—55 |
| 2,305,763 | 12/1942 | Dietrich | 197—1 |
| 2,629,478 | 2/1953 | Simon | 197—36 XR |
| 2,895,584 | 7/1959 | Hickerson et al. | 197—52 |
| 3,101,141 | 8/1963 | Canny | 197—36 |
| 3,247,941 | 4/1966 | Beattie et al. | 197—52 XR |
| 3,286,806 | 11/1966 | Schoenfelder | 197—52 XR |
| 3,308,916 | 3/1967 | Canny et al. | 197—36 |

EDGAR S. BURR, *Primary Examiner.*

U.S. Cl. X.R.

197—55, 180